(12) United States Patent
Iwasaki et al.

(10) Patent No.: US 7,936,988 B2
(45) Date of Patent: May 3, 2011

(54) IMAGING APPARATUS AND CONTROL METHOD THEREFOR

(75) Inventors: Naoki Iwasaki, Kawasaki (JP); Genjiro Shibagami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/554,751

(22) Filed: Sep. 4, 2009

(65) Prior Publication Data

US 2010/0067893 A1 Mar. 18, 2010

(30) Foreign Application Priority Data

Sep. 16, 2008 (JP) ................................. 2008-237221

(51) Int. Cl.
*G03B 13/30* (2006.01)
(52) U.S. Cl. .................................................... 396/147
(58) Field of Classification Search .................. 396/147
See application file for complete search history.

(56) References Cited

U.S. PATENT DOCUMENTS

| | | | |
|---|---|---|---|
| 4,692,008 A * | 9/1987 | Arakawa et al. | 396/284 |
| 5,528,332 A | 6/1996 | Furutsu | |
| 5,614,980 A * | 3/1997 | Wakabayashi et al. | 396/147 |
| 5,666,570 A * | 9/1997 | Ohsawa | 396/147 |
| 5,687,409 A * | 11/1997 | Miyamoto | 396/290 |
| 5,708,881 A * | 1/1998 | Tsukahara et al. | 396/281 |
| 5,794,086 A * | 8/1998 | Wakabayashi et al. | 396/284 |
| 6,141,499 A * | 10/2000 | Ohmori et al. | 396/63 |
| 6,584,284 B1 * | 6/2003 | Odaka | 396/121 |
| 7,403,705 B2 * | 7/2008 | Onozawa | 396/147 |
| 7,493,571 B2 * | 2/2009 | Shinohara et al. | 715/835 |

FOREIGN PATENT DOCUMENTS

| | | |
|---|---|---|
| JP | 6-201983 A | 7/1994 |
| JP | 2002-169082 A | 6/2002 |

* cited by examiner

*Primary Examiner* — Rodney E Fuller
(74) *Attorney, Agent, or Firm* — Canon USA, Inc. IP Division

(57) ABSTRACT

An imaging apparatus determines the appropriateness of a continuous focusing operation when performing shooting using autofocus. When the continuous focusing operation is determined to be appropriate, the imaging apparatus performs a display indicating that the imaging apparatus is in a continuous focusing operation state. The display indicating the continuous focusing operation state differs from a display indicating a focusing state determined by a focusing operation performed when the imaging apparatus is not in the continuous focusing operation state.

8 Claims, 13 Drawing Sheets

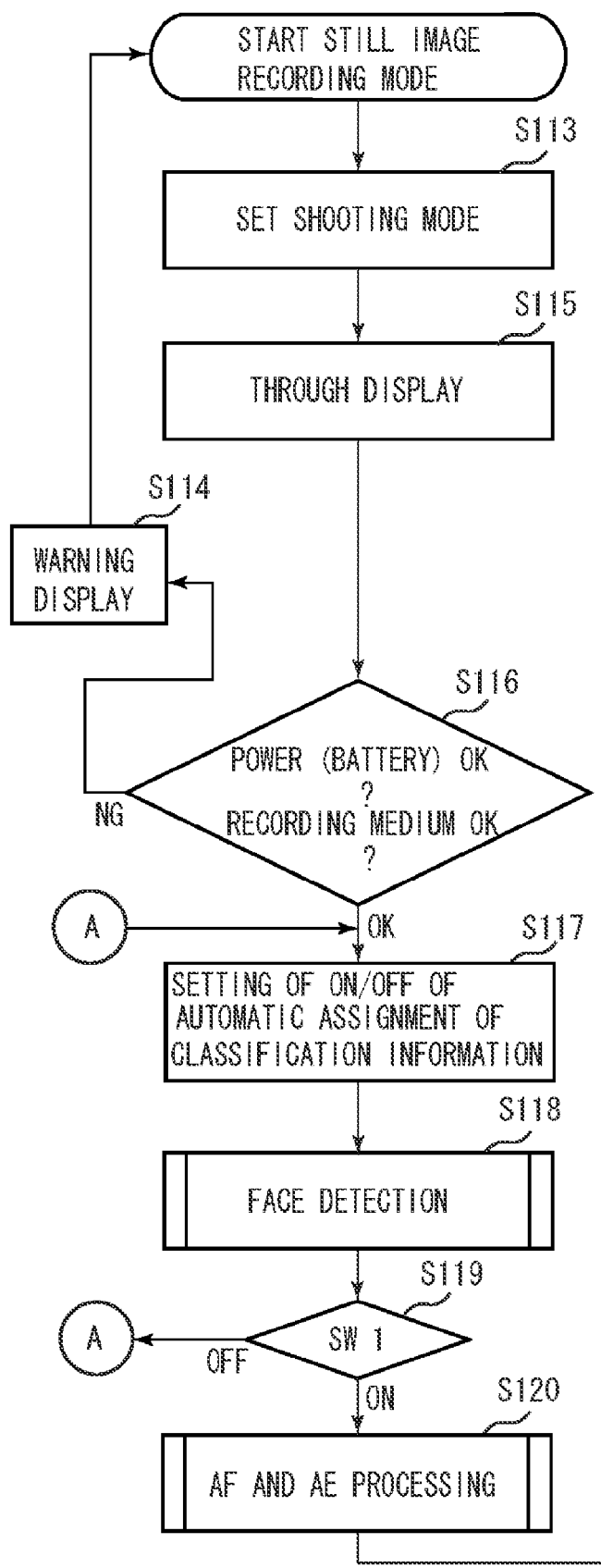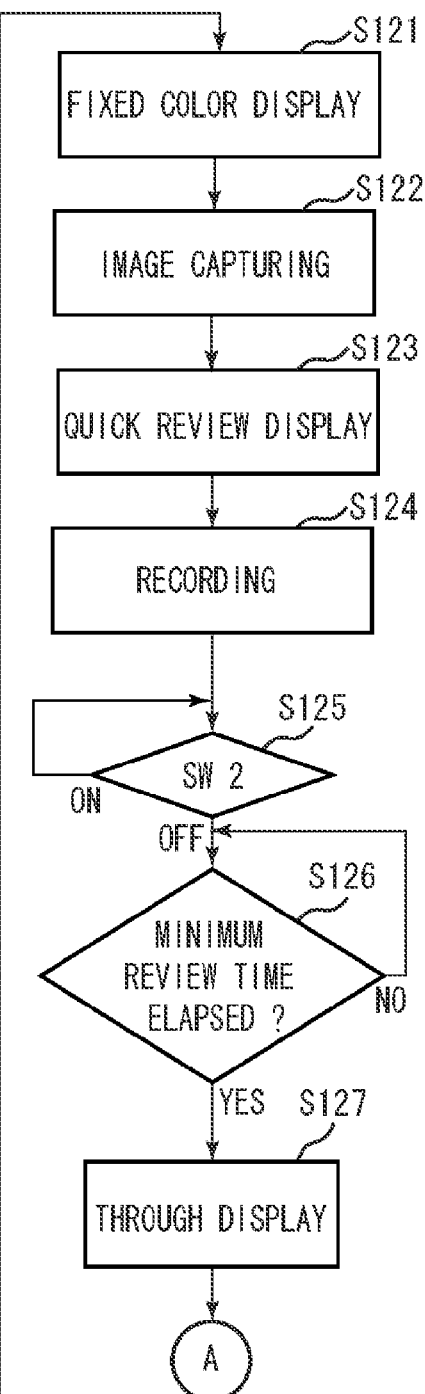
FIG. 3

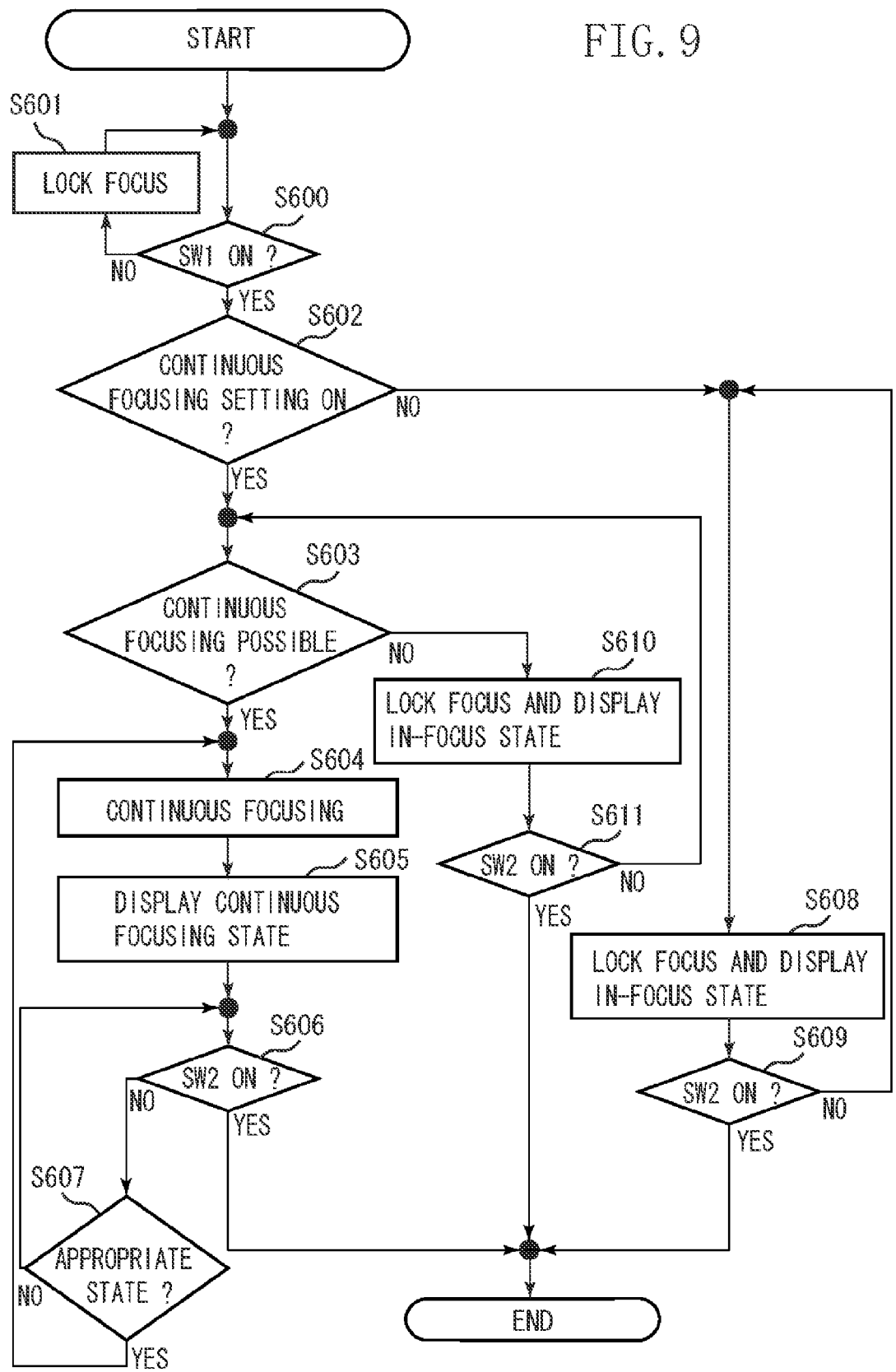

IMAGING APPARATUS AND CONTROL METHOD THEREFOR

BACKGROUND OF THE INVENTION

1. Field of the Invention

The present invention relates to an imaging apparatus and a control method therefor. More particularly, the present invention relates to an imaging apparatus having an autofocus (AF) function, and a control method therefor.

2. Description of the Related Art

Generally, an imaging apparatus, such as a digital camera or a video camera, uses an AF system which automatically performs a focusing operation using a luminance signal obtained from an image sensor, such as a charge-coupled device (CCD), as a system to focus on an object by moving the position of a photographic lens. The imaging apparatus using the AF system obtains an in-focus position by detecting a position of the photographic lens at which the highest contrast is obtained, based on a focus signal obtained by integrating high-frequency components of image data in a focusing area set in an image plane.

In order to continue to focus on a moving object, the imaging apparatus using the above AF system needs to continuously drive the photographic lens to obtain an in-focus position. In a case where an in-focus position is continuously obtained, it is useful to store the obtained in-focus position, because the next in-focus position can be predicted from a past in-focus position.

Japanese Patent Application Laid-Open No. 6-201983 discusses an example of such a technique, i.e., an imaging apparatus that causes the AF system to track an object by repeating an operation of moving, before shooting an object, a photographic lens to a position at which high contrast is obtained.

Japanese Patent Application Laid-Open No. 2002-169082 discusses a technique of repeating an operation of storing, at each shooting of an object in a continuous shooting mode or the like, an in-focus position after preliminarily moving a photographic lens to a position at which high contrast is obtained, before shooting, so as to predict an in-focus position at the next shooting and to determine a drive range of the photographic lens.

However, the techniques discussed in Japanese Patent Application Laid-Open Nos. 6-201983 and 2002-169082 have a problem that an operator cannot determine whether an in-focus position in a current focusing state is an initial in-focus position of the photographic lens after issuance of a focusing instruction, and whether the in-focus position in the current focusing state is that of the photographic lens that is obtained after continuous focusing.

SUMMARY OF THE INVENTION

The present invention is directed to an imaging apparatus capable of simply transmitting information representing properties of a current position of a photographic lens to an operator.

According to an aspect of the present invention, an imaging apparatus includes an imaging unit configured to obtain image data by photoelectric conversion of object light that is incident thereon through an imaging optical system, a display control unit configured to control a display unit to display the image data, a switch configured to receive a focusing instruction issued to the imaging optical system, and a focusing unit configured to adjust a focusing state of the imaging optical system based on the image data. When the focusing unit performs a continuous focusing operation in response to the focusing instruction received by the switch, the display control unit causes the display unit to provide a display indicating that the focusing unit is in a continuous focusing operation state. When the focusing unit does not perform the continuous focusing operation, the display control unit causes the display unit to provide a display indicating a focusing state determined by a focusing operation performed in response to an instruction received by the switch, which differs from the display indicating that the focusing unit is in the continuous focusing operation state.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a flowchart illustrating the overall operation of the digital camera.

FIG. 6Db illustrates an AF frame and characters according to an exemplary embodiment of the present invention. FIG. 6Dc illustrates an AF frame and an icon according to an exemplary embodiment of the present invention.

FIG. 9 is a flowchart illustrating a basic operation of a system control unit of an imaging apparatus according to an exemplary embodiment of the present invention.

DESCRIPTION OF THE EMBODIMENTS

Various exemplary embodiments, features, and aspects of the invention will be described in detail below with reference to the drawings.

Hereinafter, a digital camera capable of shooting a still image and a moving image, which is an imaging apparatus according to an exemplary embodiment of the present invention, is described.

Figure 1:
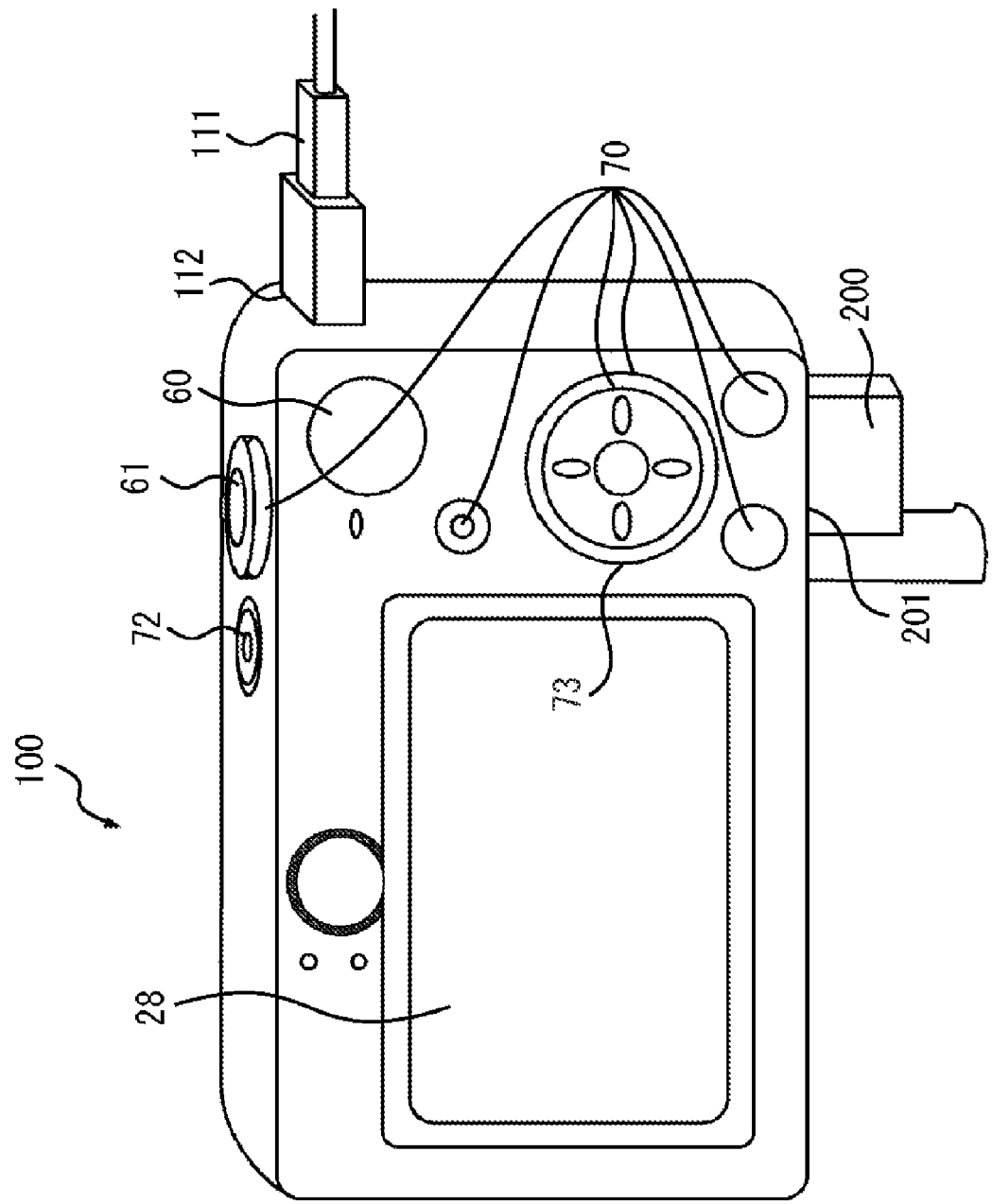
FIG. 1 illustrates an exterior of a digital camera serving as an imaging apparatus according to an exemplary embodiment of the present invention.

FIG. 1 illustrates an exterior of a digital camera 100 according to an exemplary embodiment of the present invention. As illustrated in FIG. 1, the digital camera 100 includes an image display unit 28 for displaying an image and various information, a power switch 72 for switching between turn-on and turn-off of a power unit 30, a shutter switch 61 serving as an operation unit for inputting various instructions to a system control unit 50 illustrated in FIG. 2, a mode changeover switch 60, and an operation unit 70.

The shutter switch 61 is a two-stage switch having a first stage for receiving a focusing instruction, and a second stage for receiving a shooting instruction. A first shutter switch SW1 (62) is turned on in the middle of an operation of the shutter switch 61, i.e., by a half-press of the shutter switch 61 provided on the digital camera 100. When the first shutter switch SW1 is turned on, the system control unit 50 is instructed to start shooting preparation processing, such as AF processing, auto-exposure (AE), auto-white-balance (AWB) processing, and electronic flash (EF) processing. A second shutter switch SW2 (64) is turned on by completion of the operation of the shutter switch 61, i.e., by a full-press of the shutter switch SW1. When the second shutter switch SW2 is turned on, an instruction to perform an imaging operation from a process of reading of a signal from an imaging unit 22 to a process of writing of image data to a recording medium 200 is output to the system control unit 50. The mode changeover switch 60 switches an operation mode of the system control unit 50 by selecting one of a plurality of modes such as a still image recording mode, a moving image recording mode, and a reproducing mode.

The operation unit 70 accepts various operations performed by an operator. The operation unit 70 includes operation members, such as various buttons and touch panels, e.g., an erase button, a menu button, a SET button, a cross-shaped four-way switch (an upper key, a lower key, a right key, and a left key), and a wheel 73.

The digital camera 100 further includes a connection cable 111 and a connector 112. The connection cable 111 connects the digital camera 100 to an external device. The connector 112 connects the connection cable 111 to the digital camera 100.

The recording medium 200 is stored in a recording medium slot 201. The recording medium 200 is, e.g., a memory card or a hard disk.

Figure 2:
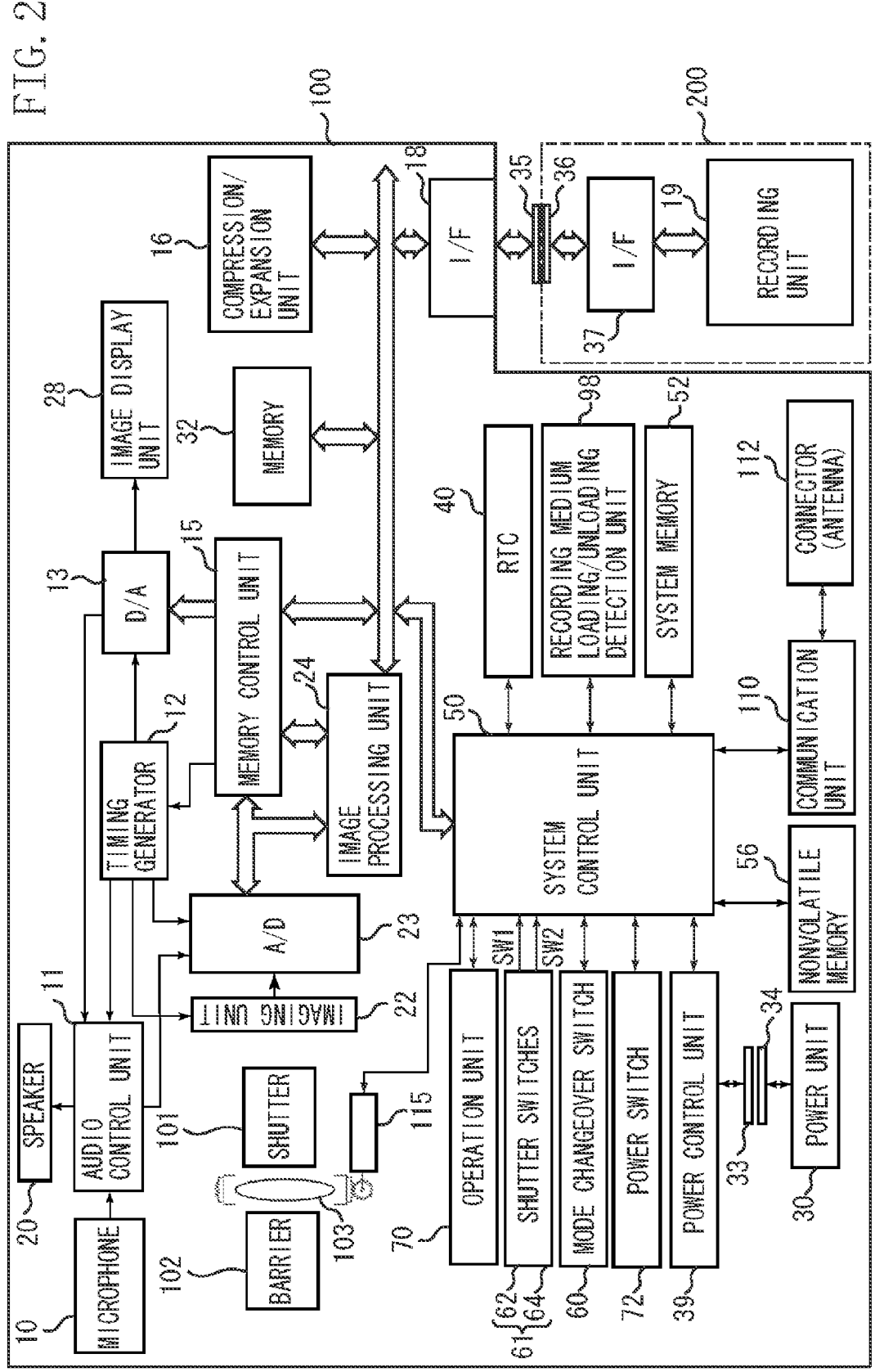
FIG. 2 is a block diagram illustrating a configuration of the digital camera illustrated in FIG. 1.

FIG. 2 is a block diagram illustrating a configuration of the digital camera 100 according to the exemplary embodiment of the present invention. The digital camera 100 includes an imaging optical system including a photographic lens 103 and a shutter 101. In this imaging optical system, the shutter 101 includes a diaphragm setting unit for adjusting a diaphragm, and a shutter speed adjusting unit for adjusting a shutter speed. The imaging unit 22 is an image sensor, such as a CCD and a complementary metal-oxide semiconductor (CMOS), for converting an optical image into an electric signal.

The digital camera 100 further includes an analog-to-digital (A/D) converter 23, an audio control unit 11, a barrier 102, and a lens drive unit 115. The A/D converter 23 converts an analog signal representing image data output from the imaging unit 22 into a digital signal. The A/D converter 23 converts an analog signal representing audio data output from the audio control unit 11 into a digital signal. The barrier 102 covers the imaging unit 22 of the digital camera 100, which includes the barrier 102, to prevent the imaging unit 22 from being stained and damaged. The lens drive unit 115 is a drive unit for moving the photographic lens 103.

The digital camera 100 includes also a timing generator 12, an image processing unit 24, a system control unit 50, a memory 32, and a compression/expansion unit 16.

The timing generator 12 supplies clock signals and control signals to the imaging unit 22, the audio control unit 11, the A/D converter 23, and a digital-to-analog (D/A) converter 13. The timing generator 12 is controlled by the memory control unit 15 and the system control unit 50. The image processing unit 24 performs predetermined resize processing such as a pixel interpolation or reduction, and color conversion processing on image data output from the A/D converter 23 or from the memory control unit 15. The image processing unit 24 performs predetermined computing processing using image data of an image captured by the imaging unit 22. The system control unit 50 performs exposure control processing, and AF control processing based on results of the computing processing performed by the image processing unit 24. More specifically, the system control unit 50 performs through-the-lens (TTL) type AF processing, auto-exposure (AE) processing, electronic flash pre-emission (EF) processing, and TTL type AWB processing.

The memory 32 stores output data of the A/D converter 23, i.e., image data via the image processing unit 24 and the memory control unit 15 or directly via the memory control unit 15. The memory 32 stores audio data of sounds recorded by a microphone 10, image data of a captured still image, and a file header constituting an image file of moving image data.

The compression/expansion unit 16 performs compression/expansion on image data by an adaptive discrete cosine transform (ADCT) or the like. The compression/expansion unit 16 reads image data stored in the memory 32 using the shutter 101 as a trigger, i.e., still image data or moving image data and performs compression on the read image data. Then, the compression/expansion unit 16 writes the compressed image data to the memory 32. The compression/expansion unit 16 reads the compressed image data read from a recording unit 19 or the like to the memory 32 and performs expansion on the read image data. Then, the compression/expansion unit 16 writes the expanded image data to the memory 32. The compressed image data and the expanded image data written to the memory 32 by the compression/expansion unit 16 are formed by a file unit of the system control unit 50 into a file. Then, the file is recorded on the recording medium 200 via an interface 18.

The digital camera 100 includes an image display unit 28, a microphone 10, and a nonvolatile memory 56.

The image display unit 28 is a liquid crystal display (LCD) or the like, and displays image data to be displayed, which is written to the memory 32, e.g., expanded image data via the D/A converter 13. The memory 32 serves also as a memory for displaying an image. The microphone 10 outputs an audio signal. This audio signal is converted into a digital signal in the A/D converter 23 via the audio control unit 11 including an amplifier. Then, the digital signal is stored in the memory 32 by the memory control unit 15 as audio data. On the other hand, the audio data recorded on the recording medium 200 is read to the memory 32. Then, the read audio data is controlled by the audio control unit 11 via the D/A converter 13 and output from a speaker 20.

A nonvolatile memory 56 is electrically erasable and recordable. For example, an electrically erasable programmable read-only memory (EEPROM) or the like can be used as the nonvolatile memory 56. In the nonvolatile memory 56, constants, programs, and the like for an operation of the system control unit 50 are stored.

The digital camera 100 further includes an operation unit 70 illustrated in FIG. 1. Appropriate functions representing corresponding to functional icons in each scene are assigned to operation members of the operation unit 70. These icons serve as various functional buttons. Examples of the functional buttons are an end button, a return button, an image feed button, a jump button, a narrowing button, an attribute changing button, and a menu button. For example, when the menu button is pressed, a menu screen on which various types of setting can be performed is displayed in the image display unit 28. An operator can intuitively perform various types of setting using the menu screen displayed in the image display unit 28, the functional icons, the four-way keys, and the SET button.

The digital camera 100 further includes a power control unit 39, a real-time clock (RTC) 40, the interface 18, the recording medium 200, a communication unit 110, and the connector 112.

The power control unit 39 includes a battery detection circuit, a direct current (DC) to direct current (DC) converter, and a switch circuit for switching a block to be energized. The power control unit 39 detects whether a battery is mounted, the type of the battery, and a remaining battery level. The battery control unit 39 controls the DC-DC converter based on a result of such detection and an instruction from the system control unit 50. The battery control unit 39 supplies a necessary voltage to each of component units including the recording medium 200 for a necessary time. The power unit 39 includes primary batteries, such as an alkaline battery and a lithium battery, secondary batteries, such a nickel-cadmium (NiCd) battery, a nickel metal hydride (NiMH) battery, and a lithium (Li) battery, an alternating current (AC) adapter, and the like. Connectors 33 and 34 connect the power unit 30 to the power control unit 39.

The RTC 40 has another power unit provided therein in addition to the power control unit 39. Even when the power unit 30 is turned off, the RTC continues to perform a clock operation. The system control unit 50 controls a timer using time and date acquired from the RTC 40 at startup. The interface 18 interfaces the digital camera 100 to the recording medium 200 such as a memory card or a hard disk. The connector 35 connects the interface 18 to the recording medium 200. A recording medium loading/unloading detection unit 98 detects whether the recording medium 200 is attached to the connector 35.

The recording medium 200 is, e.g., a memory card or a hard disk. The recording medium 200 has a recording unit 19 that includes a semiconductor memory or a magnetic disk, an interface 37 that interfaces with the digital camera 100, and a connector 36 for connecting the recording medium 200 to the digital camera 100. The communication unit 110 performs various types of communication processing, such as RS232C, universal serial bus (USB), institute of electrical and electronic engineers (IEEE) 1394, IEEE P1284, small computer system interface (SCSI), modem, local area network (LAN), and wireless communication processing. A connector (or antenna in the case of wireless communication) 112 connects the digital camera 100 to another apparatus via the communication unit 110.

Hereinafter, the digital camera 100 according to the present invention is described in detail with reference to FIGS. 3 through 8.

FIG. 3 is a flowchart illustrating a still image recording process performed by the digital camera 100. In step S113, when a still image recording mode is started, the system control unit 50 sets a shooting mode as follows. That is, when a shooting mode upon termination of the last still image recording mode is acquired from the nonvolatile memory 56, the system control unit 50 causes a system memory 52 to store the acquired shooting mode as a current shooting mode. Alternatively, when an operator operates the operation unit 70 to set and input a shooting mode, the system control unit 50 causes the system memory 52 to store the input shooting mode as the current shooting mode. The term "shooting mode" designates a mode implemented by a combination of setting a shutter speed, an aperture value, a flash emission state, and a sensitivity.

In step S115, the system control unit 50 outputs to the image display unit 28 image data output from the imaging unit 22. Then, the system control unit 50 causes the image display unit 28 to display the image data on the screen thereof. In step S116, the system control unit 50 determines the presence/absence of the mounted power unit 30, the remaining amount of the power unit 30, and the presence/absence of the recording medium 200. If the power unit 30 or the recording medium 200 has a trouble (NG in step S116), in step S114, the system control unit 50 performs a warning indication by an image or a sound using at least one of the image display unit 28 and the speaker 20. Subsequently, the process returns to the start of the still image recording mode. If neither the power unit 30 nor the recording medium 200 has a trouble (OK in step S116), the process proceeds to step S117. If necessary, the system control unit 50 performs the activation/inactivation (on/off) of the automatic assignment of classification information based on the shooting mode and/or an object condition.

An operator can optionally set the activation/inactivation of the automatic assignment of classification information on a menu screen (not shown) displayed by pressing the menu button included in the operation unit 70. In this case, the setting of the activation/inactivation of the automatic assignment of classification information is to set a flag indicating whether the automatic assignment of classification information based on the shooting mode and/or an object condition is performed. The system memory 52 stores a value set in the flag indicating the activation/inactivation of the automatic assignment of classification information. Thus, the digital camera can prevent the assignment of classification information unintended by an operator to each shooting.

In step S118, the system control unit 50 detects a characteristic portion of a moving object and the position and the size of the characteristic portion. More specifically, the system control portion 50 performs, when the moving object is, e.g., a person, a process (hereinafter referred to as a face detection sequence) of detecting whether the face of the person appears in an image represented by image data, which is displayed in the image display unit 28. The face detection sequence performed in step S118 will be described in detail below with reference to FIG. 8.

In step S118, the system control unit 50 causes, when the face of the moving person is detected, the system memory 52 to store the coordinates of the positions of the faces of the moving person detected in the image represented by the image data, the dimensions (width and height) of the detected faces, the number of the detected faces, and a confidence coefficient of the detection as information on the face of the person. If the face of the person is not detected in the face detection sequence performed in step S118, for example, a value of 0 is set in storage areas respectively corresponding to the coordinates of the positions of the detected faces of the moving person, the dimensions (width and height) of the detected faces, the number of the detected faces, and a confidence coefficient of the detection. Thus, the stored information indicates that no face of a person is detected.

In step S119, the system control unit 50 determines the on-state/off-state of the first shutter switch SW1. If the first shutter switch SW1 is off, i.e., the first shutter switch SW1 is not pressed (OFF in step S119), the sequence of the automatic assignment of classification information in step S117 and the face detection sequence in step S118 are repeated. If the first shutter switch SW1 is turned on, i.e., the first shutter switch SW1 is pressed (ON in step S119), the process proceeds to step S120, in which an AF/AE sequence is performed.

In step S120, in the AF/AE sequence, the system control unit 50 performs AF processing to focus the photographic lens 103 on the object. Then, AE processing is performed. Thus, an aperture value and a shutter speed (or shutter time) are determined. If necessary, the setting of flash can be performed in the AE processing. At that time, if the face of the person is detected in step S118, automatic focusing can be performed within the range of the face of the person detected in the AF/AE sequence. This AF/AE sequence will be described below in detail with reference to FIG. 4. Upon completion of the AF/AE sequence, the process proceeds to step S121.

In step S121, the system control unit 50 sets a display state of the image display unit 28 as a fixed color display state. Then, the process proceeds to step S122.

In step S122, the system control unit 50 performs image capturing as follows. First, the system control unit 50 writes captured image data to the memory 32 via the imaging unit 22, the A/D converter 23, the image processing unit 24, and the memory control unit 15, or directly via the memory control unit 15 from the A/D converter 23. Subsequently, the system control unit 50 reads the image data written to the memory 32, using the memory control unit 15 and, if necessary, the image processing unit 24. Then, the system control unit 50 performs various types of development processing on the read image data.

In step S123, upon completion of the image capturing, the system control unit 50 performs a quick review display operation for causing the image display unit 28 to display an image represented by the captured image data. After the quick review display operation, in step S124, the system control unit 50 writes the captured image data to the recording medium 200 as an image file. Upon completion of recording in step S124, the system control unit 50 causes the image display unit 28 to continue to perform the quick review display operation until the second shutter switch SW2 is released. Consequently, the operator can carefully check the captured image data.

Upon completion of recording in step S124, then in step S125, it is detected whether a finger of the operator is released from the second shutter switch SW2. If the finger of the operator is released from the second shutter switch SW2 after the image represented by the captured image data is checked by keeping pressing the second shutter switch SW2 to continue the quick review display operation (OFF in step S125), the process proceeds to step S126.

In step S126, it is determined whether a predetermined minimum review time has elapsed. If the predetermined minimum review time has elapsed (YES in step S126), the process proceeds to step S127. In this case, after the captured image data can be checked by performing the quick review display operation in the image display unit 28, the image display unit 28 can be brought into a state in which images represented by image data output from the imaging unit 22 are sequentially displayed for the next shooting. Upon completion of step S127, the current processing ends. Then, the process returns to step S117, in which the system control unit 50 prepares for the next shooting.

Figure 4:
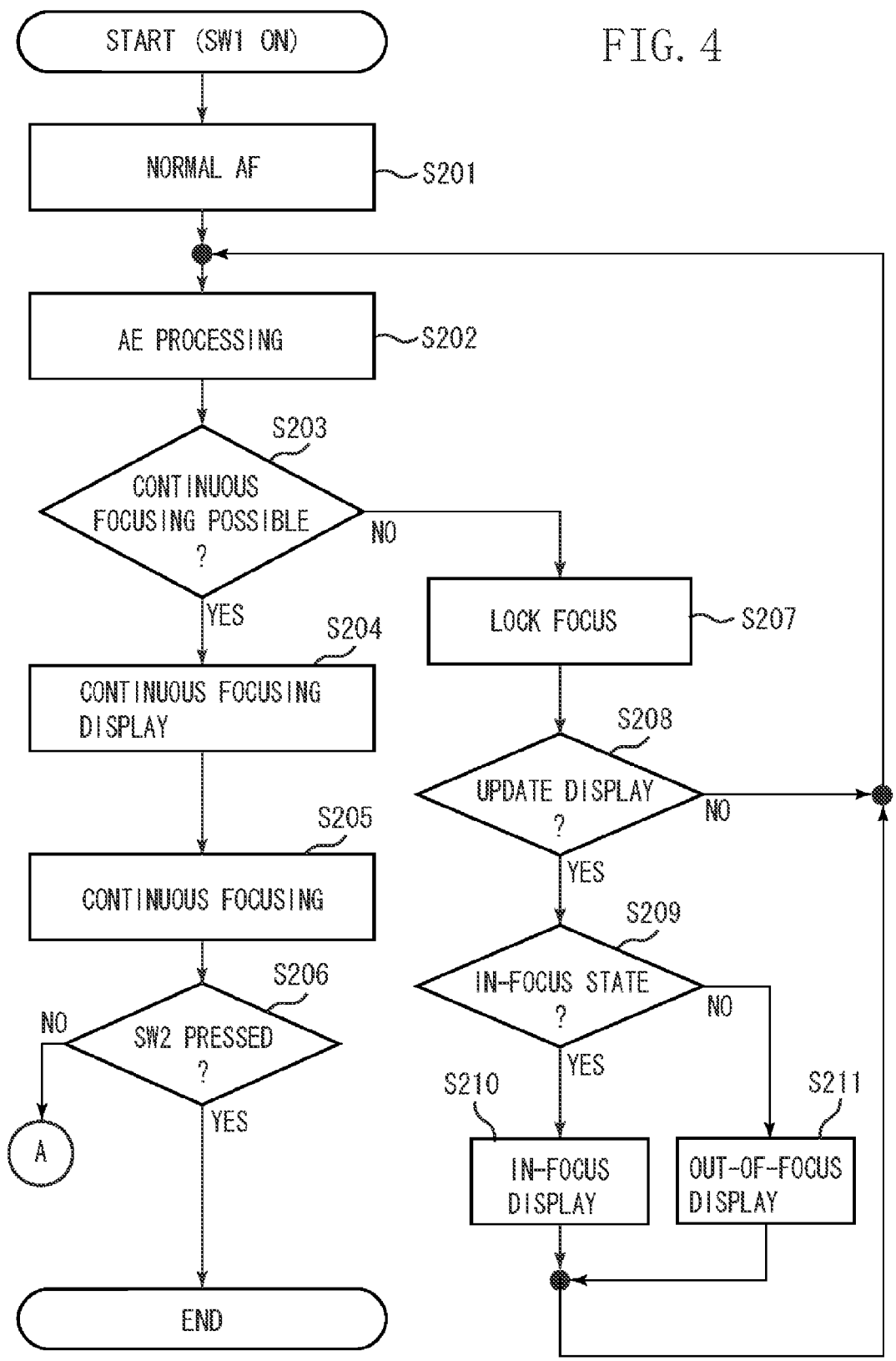
FIG. 4 is a flowchart illustrating an operation of the digital camera according to the exemplary embodiment of the present invention.

FIG. 4 is a flowchart illustrating the AF/AE sequence (corresponding to step S122 illustrated in FIG. 3) performed by the digital camera 100.

When the first shutter switch SW1 is turned on by pressing the shutter switch 61, the processing proceeds to step S201.

In step S201, the system control unit 50 performs a normal AF operation. The normal AF operation is an operation of turning on the first shutter switch SW1, focusing the photographic lens on a characteristic portion of an object by a photographic lens drive unit, and then locking the focus of the lens. The normal AF operation will be described in detail below with reference to FIG. 5.

In step S202, the system control unit 50 performs AE processing based on an output of the image processing unit 24, for a main exposure. In step S203, the system control unit 50 functions as a determination unit, and checks the frame rate, the aperture value, the shutter speed, and a digital gain determined by the AE processing. The digital gain is defined as an amplification factor in the case of amplifying the captured image data. When the size of the captured image data is small, the object is liable to be shot dark. However, an object can be shot light by increasing the digital gain and amplifying the image data. In this case, the system control unit 50 determines whether continuous measurement of an in-focus state of an object can be performed at this frame rate, i.e., whether a continuous focusing operation (continuous focusing processing) can be performed at this frame rate. Alternatively, it is determined according to an aperture value, a shutter speed, or a digital gain whether a continuous focusing operation is appropriate. If a continuous focusing operation is appropriate (YES in step S203), the process proceeds to step S204. If a continuous focusing operation is inappropriate (NO in step S203), the process proceeds to step S207.

At some aperture values, a continuous focusing operation is inappropriate for the following reason. That is, when the aperture value at the shooting is set closer to a full-aperture state than the aperture value at the scanning, a depth of field at the shooting is shallow, so that a captured image becomes out of focus. At some values of the shutter speed, a continuous focusing operation is inappropriate for the following reason. That is, when the shutter speed is increased in a case where a moving body is tracked by continuously focusing, reliability of a focus signal is degraded due to influence of an image shake. The focus signal is a signal obtained by integrating high-frequency components of image signals representing image data in a focusing region set in each image plane. The focus signal indicates a focusing state of an imaging optical system.

At some values of the digital gain, a continuous focusing operation is inappropriate for the following reason. That is, when the digital gain is set at a large value, noise is generated in an image represented by image data. The reliability of a focus signal is degraded.

In step S203, if the continuous focusing operation is determined to be inappropriate, the processing proceeds to step S207, in which the system control unit 50 locks a focus. Then, the processing proceeds to step S208.

Figure 6A:
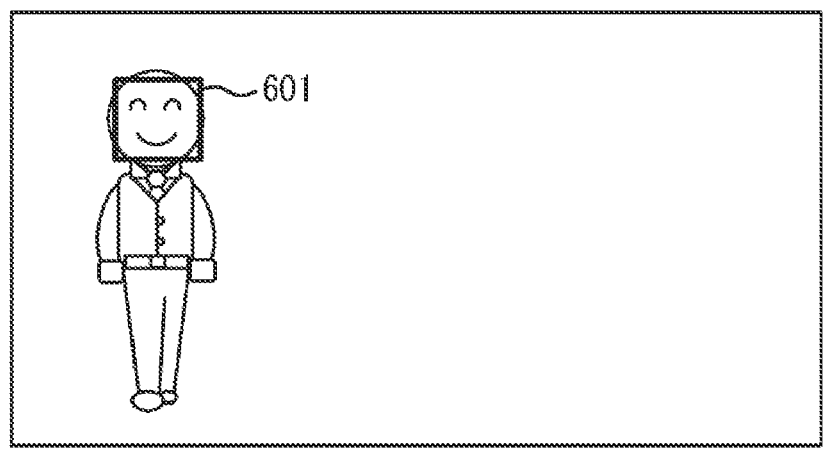
FIGS. 6Aa, 6Ab, and 6Ac illustrate an AF frame and a tracking condition thereof according to an exemplary embodiment of the present invention.
Figure 6A:
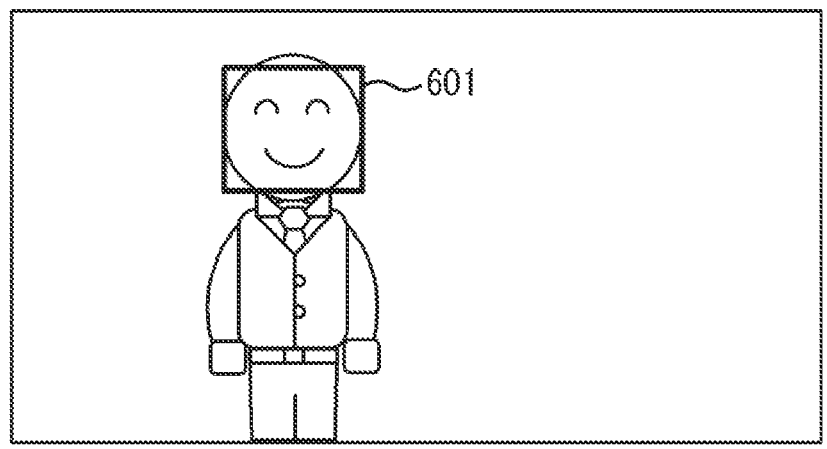
Figure 6A:
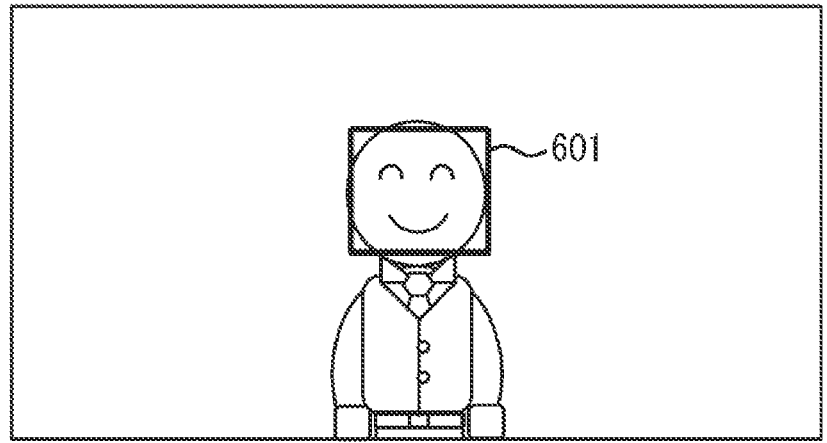
Figure 6B:
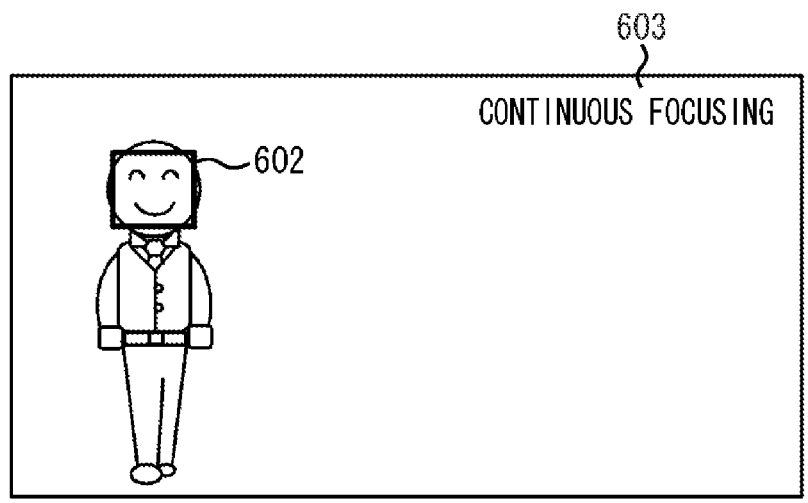
FIGS. 6Ba, 6Bb, and 6Bc illustrate an AF frame, characters and a tracking condition of the AF frame according to an exemplary embodiment of the present invention.
Figure 6B:
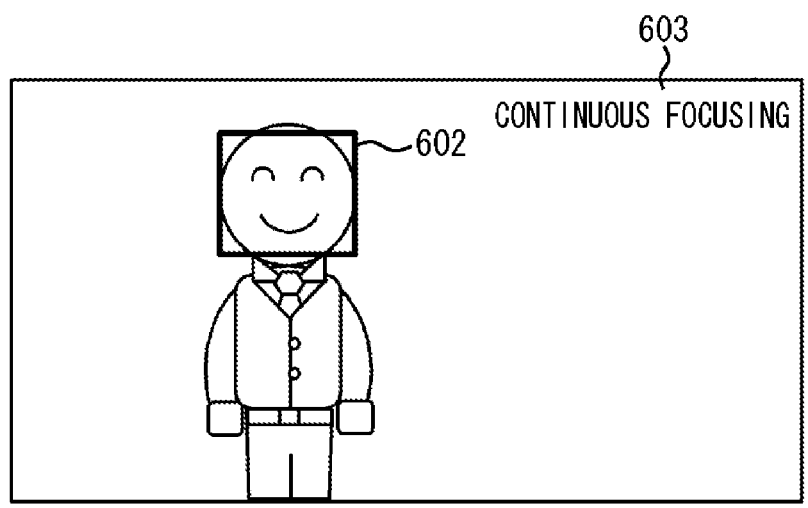
Figure 6B:
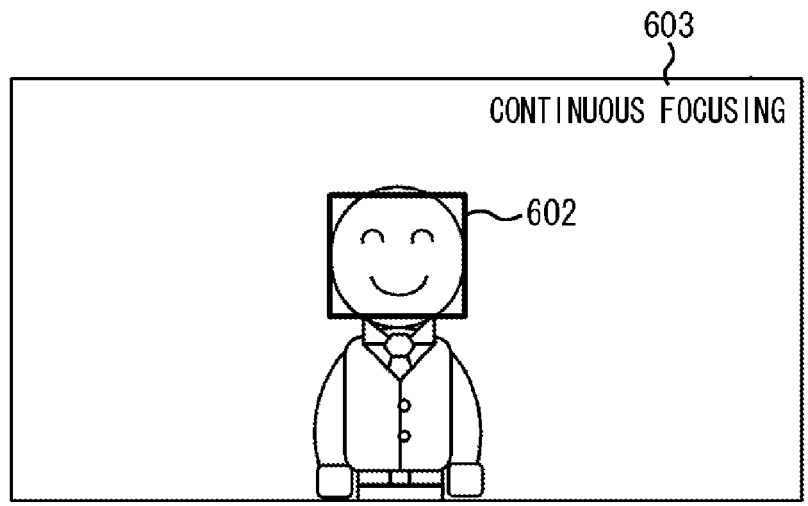
Figure 6C:
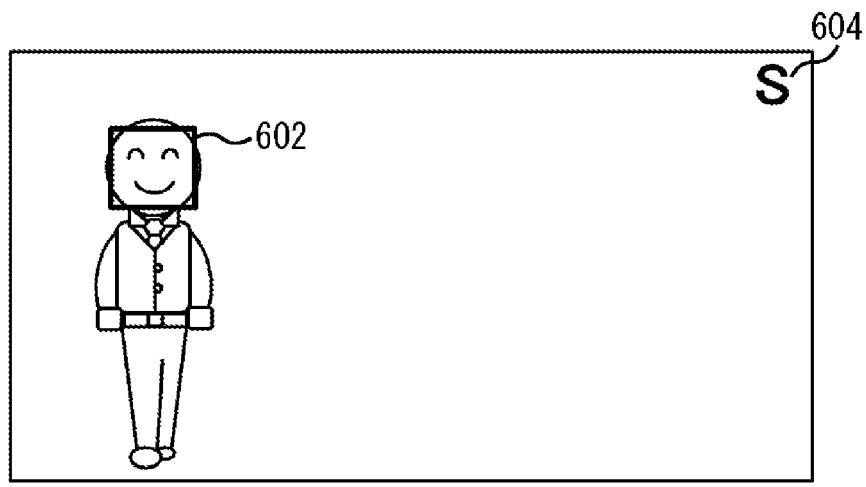
FIGS. 6Ca, 6Cb, and 6Cc illustrate an AF frame, icons and a tracking condition of the AF frame according to an exemplary embodiment of the present invention.
Figure 6C:
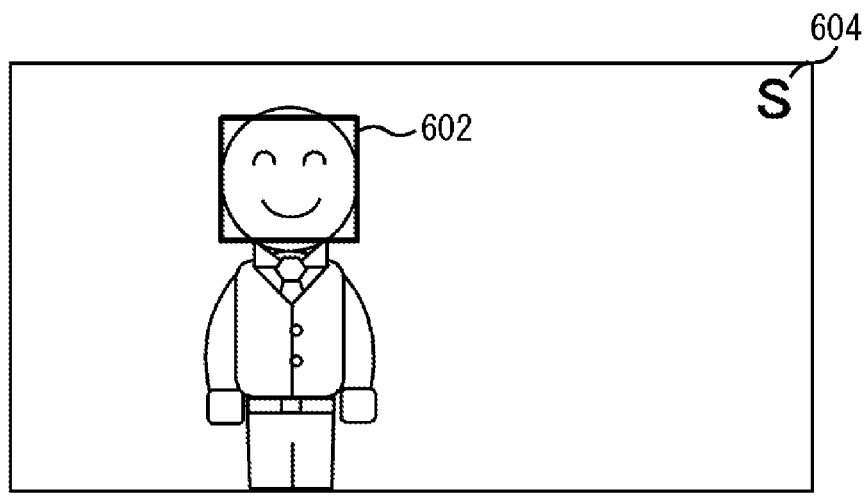
Figure 6C:
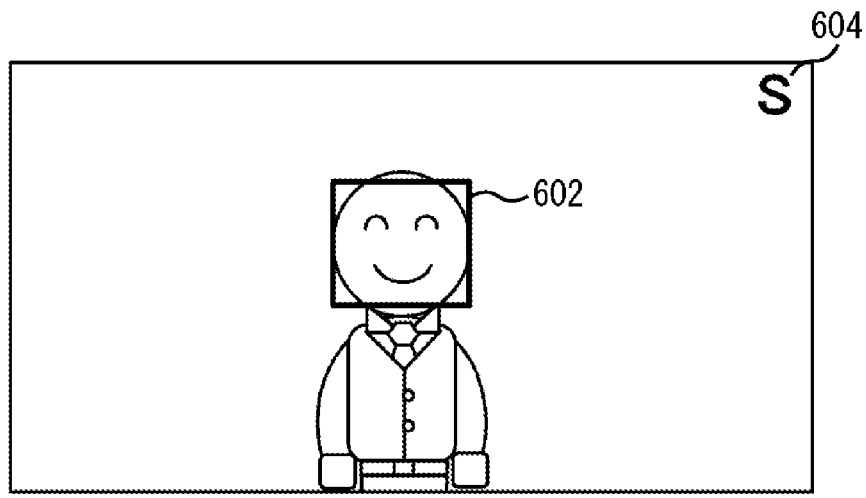
Figure 6D:
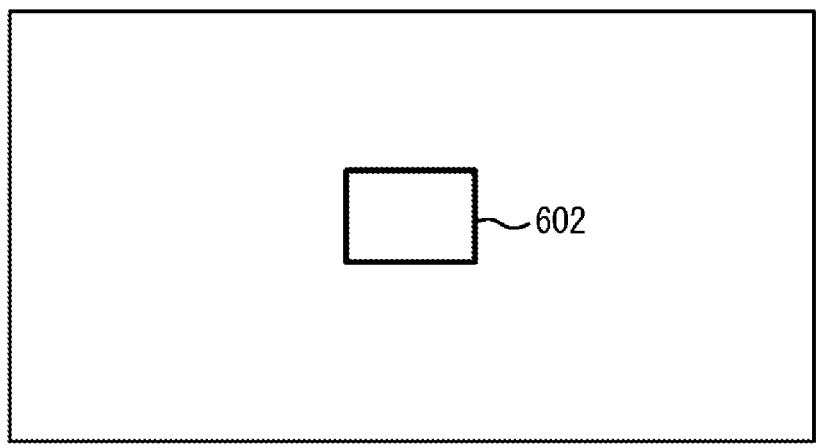
FIG. 6Da illustrates an AF frame according to an exemplary embodiment of the present invention.
Figure 6D:
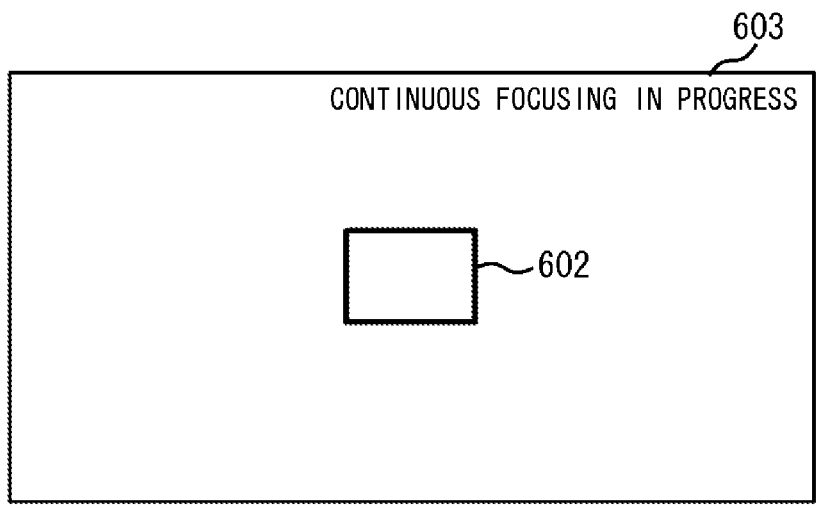
Figure 6D:
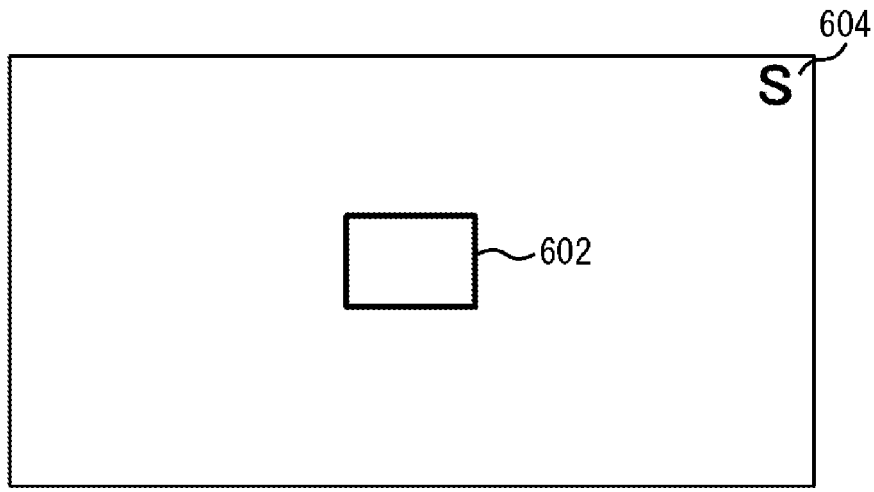

In step S208, the system control unit 50 determines whether a display indicated by the image display unit 28 is updated. More specifically, the system control unit 50 determines whether a continuous focusing operation is once performed. If no continuous focusing operation is performed at all (YES in step S208), the processing proceeds to step S209, in which the system control unit 50 determines a focusing state based on a result of the normal AF. If the system control unit 50 determines that the focusing state is an in-focus state (YES in step S209), the processing proceeds to step S210, in which the system control unit 50 outputs an AF frame 601 to the image display unit 28, as illustrated in FIGS. 6Aa, 6Ab, and 6Ac.

In this case, the system control unit 50 changes the color of the AF frame 601 into green. The green AF frame 601 represents the in-focus state. On the other hand, if the system control unit 50 determines that the focusing state is an out-of-focus state (NO in step S209), the processing proceeds to step S211, in which the system control unit 50 outputs an out-of-focus display to the image display unit 28. The system control unit 50 changes the color of the AF frame 601 into an original color, e.g., yellow. When the focus is locked, an easily understandable indication means can be selected from an indication by the color of the AF frame 601, that represented by characters, and that represented by an icon.

On the other hand, in step S204, the system control unit 50 provides a display indicating that the focusing operation is in a continuous focusing operation state. This display is implemented by changing the color of the AF frame 601 (see FIGS. 6Aa, 6Ab, and 6Ac), using characters 603 (see FIGS. 6Ba, 6Bb, and 6Bc), using an icon 604 (see FIGS. 6Ca, 6Cb, and 6Cc), or using a combination of such means. Alternatively, another easily understandable display for an operator can be added to the AF frame 601. A display indicating that the apparatus is in a continuous focusing operation state is implemented by using the color, the characters, and the icon, which differ from those of the display which is obtained by locking the focus and which indicates that the focusing state is an in-focus state. For example, in a case where the color of the AF frame 601 is changed into green in step S210, the color of the display indicating that the focusing operation is in a continuous focusing operation state is set to differ from green. Thus, both of these displays are clearly distinguished from each other.

In step S206, the system control unit 50 makes a determination on whether the second shutter switch SW2 is pressed. As a result of the determination, if it is determined that the second shutter switch SW2 is not pressed (NO in step S206), the processing proceeds to step S117 illustrated in FIG. 3. On the other hand, if it is determined that the second shutter switch SW2 is pressed (YES in step S206), the AF/AE sequence ends.

Figure 6E:
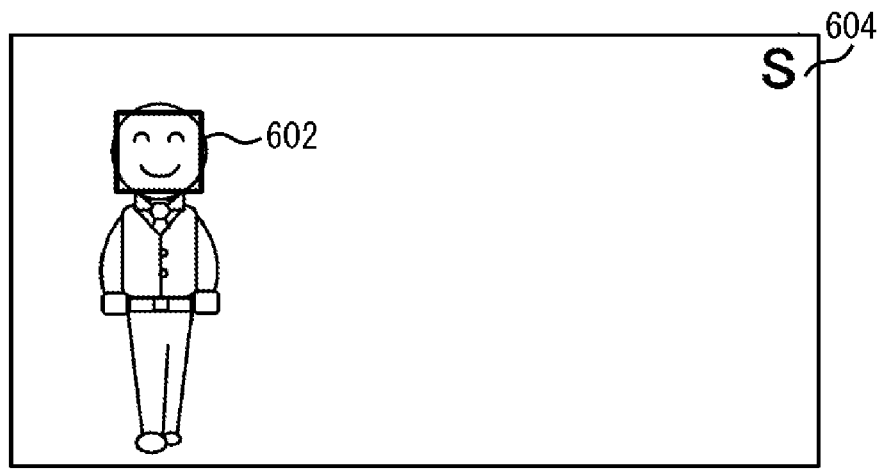
FIGS. 6Ea, 6Eb, and 6Ec illustrate an AF frame, icons and a tracking condition of the AF frame.
Figure 6E:
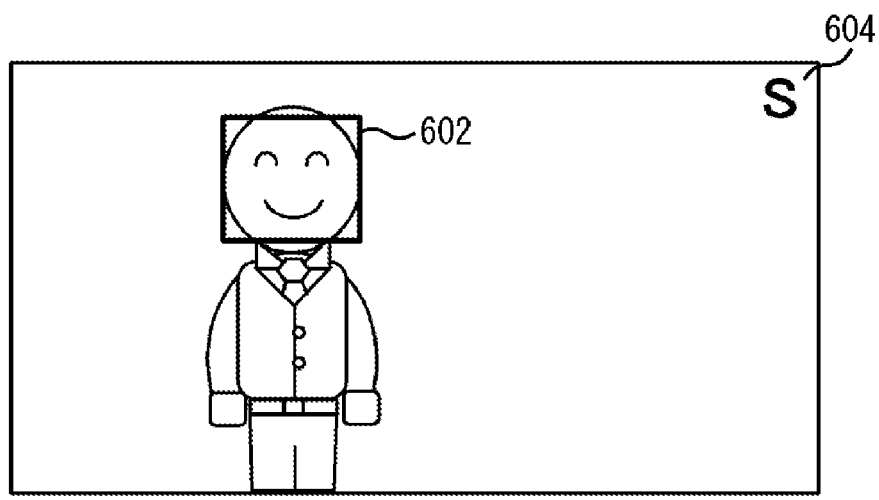
Figure 6E:
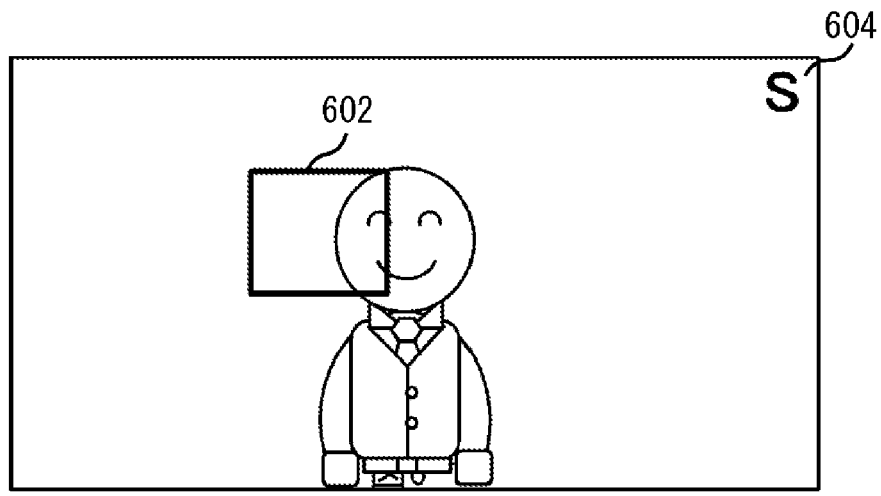

When a continuous focusing operation is started, the system control unit 50 does not update the display, as long as the focusing is continued. FIGS. 6Ea and 6Eb illustrate a case where a continuous focusing operation can be performed. At that time, in the case illustrated in FIGS. 6Ea and 6Eb, the frame rate, the shutter speed, the aperture value, or the gain is a condition for enabling a continuous focusing operation. FIG. 6Ec illustrates a case where the frame rate, the shutter speed, the aperture value, or the gain is a condition for disabling a continuous focusing operation.

In a case where a person moves quickly, and where his face is out of the face frame, the display is not updated, and a continuous focusing operation is continued if the frame rate, the shutter speed, the aperture value, or the gain is a condition for enabling a continuous focusing operation. In this case, even when the face is out of the face frame so that a focus signal varies, focusing is continuously performed. Thus, even when the focusing state is an out-of-focus state, the focusing state can be returned to an in-focus state again.

In a case where a shooting condition, e.g., an exposure changes after a continuous focusing operation is disabled, and where thus a continuous focusing operation is enabled, the sequence returns to step S202. In step S203, it is determined whether a continuous focusing operation can be performed. Then, the subsequent processing is repeated. In this case, in step S204, a display indicating a continuous focusing operation state is provided.

Thus, an operator of the digital camera 100 can easily recognize whether the position of the photographic lens 103 is in a continuous focusing operation state, or whether the position of the photographic lens 103 is the first in-focus position after a normal AF focusing instruction is issued. Thus, the operator can take an image of an object by accurately recognizing a current focusing state.

Figure 5:
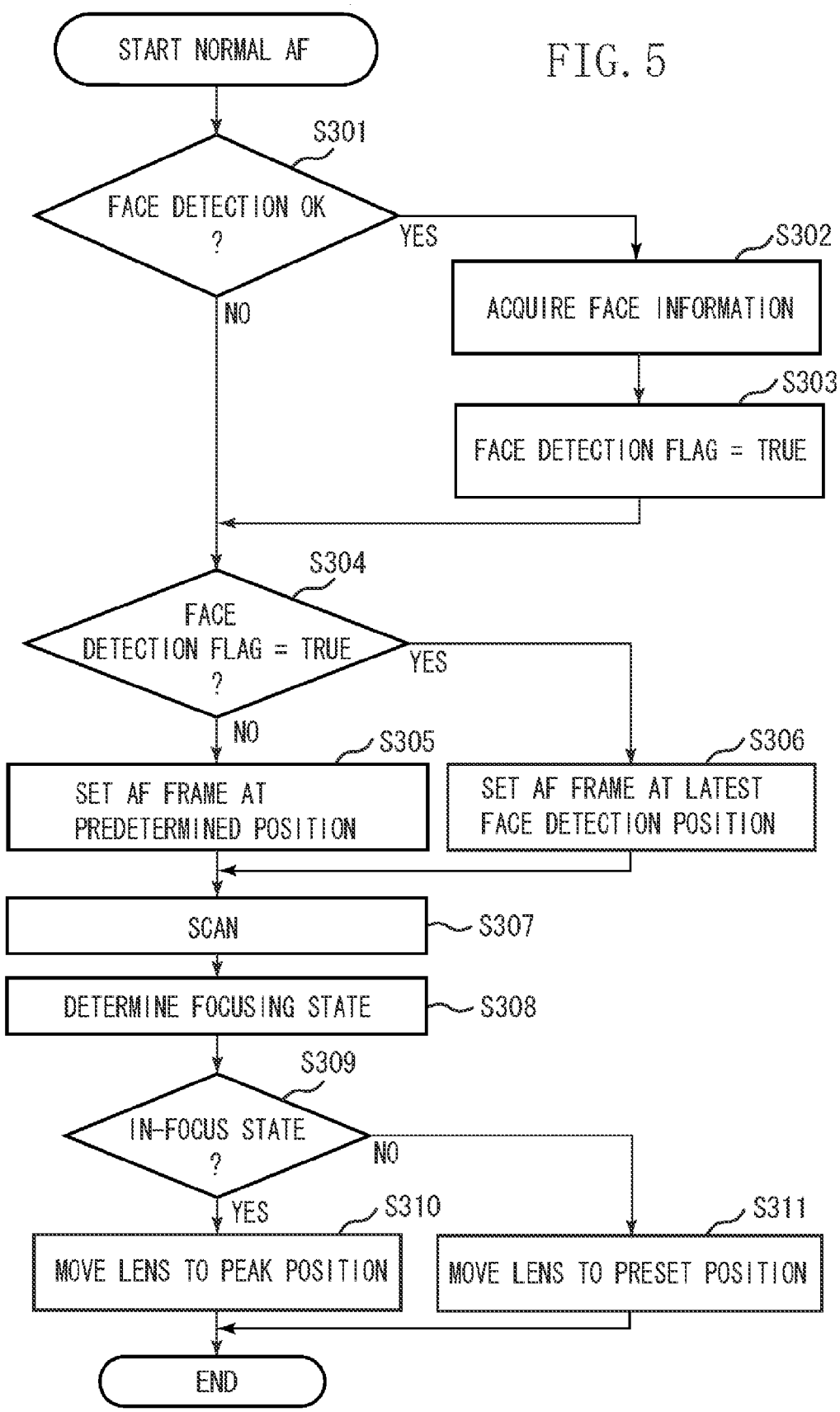
FIG. 5 is a flowchart illustrating a normal AF operation of the digital camera according to the exemplary embodiment of the present invention.

Next, a normal AF subroutine corresponding to step S201 in the flowchart illustrated in FIG. 4 is described hereinafter with reference to a flowchart illustrated in FIG. 5.

First, in step S301, based on a result of the face detection sequence performed in step S118, the system control unit 50 determines whether a person's face (hereunder referred to simply as a face) is detected. If the face is detected (YES in step S301), the processing proceeds to step S302. On the other hand, if the face is not detected (NO in step S301), the processing proceeds to step S304.

In step S302, the system control unit 50 acquires face information representing the position and the size of the face detected in the face detection sequence performed in step S118. In step S303, the system control unit 50 sets a value of "TRUE" in a face detection flag. In step S304, the system control unit 50 checks a state of the face detection flag. If the value of the face detection flag is "TRUE" (YES in step S304), the processing proceeds to step S306. If the value of the face detection flag is "FALSE" (NO in step S304), the processing proceeds to step S305.

In step S306, the system control unit 50 sets the AF frame 602 at the latest detection position of the face. In step S306, when the face is detected, the size of the AF frame 602 can be set at a predetermined size. Alternatively, the size of the AF frame 602 can be determined based on the detected size of the face. In step S305, the system control unit 50 sets the AF frame 602 at a predetermined position, e.g., in a central area (see FIGS. 6Da, 6Db, and 6Dc). In step S307, the system control unit scans the object. Then, the processing proceeds to step S308. In step S308, the system control unit 50 makes a determination on a focusing state. In step S309, the system control unit 50 determines whether a result of the determination in step S308 is an in-focus state. If the result of the determination indicates an in-focus state (YES in step S309), the processing proceeds to step S310. If the result of the determination indicates an out-of-focus state (NO in step S309), the processing proceeds to step S311.

In step S310, the system control unit 50 moves the photographic lens 103 to a peak position calculated by scanning the object in step S307. Then, the normal AF operation is completed. In step S311, the system control unit 50 moves the photographic lens 103 to a preset position (fixed point). Then, the normal AF operation is completed. The fixed point is set at the position of the photographic lens 103 corresponding to a distance at which the existing probability of the object is high. If the face is detected, the distance can be set at a value of a distance to the person, which is estimated based on the size of the face.

Figure 7:
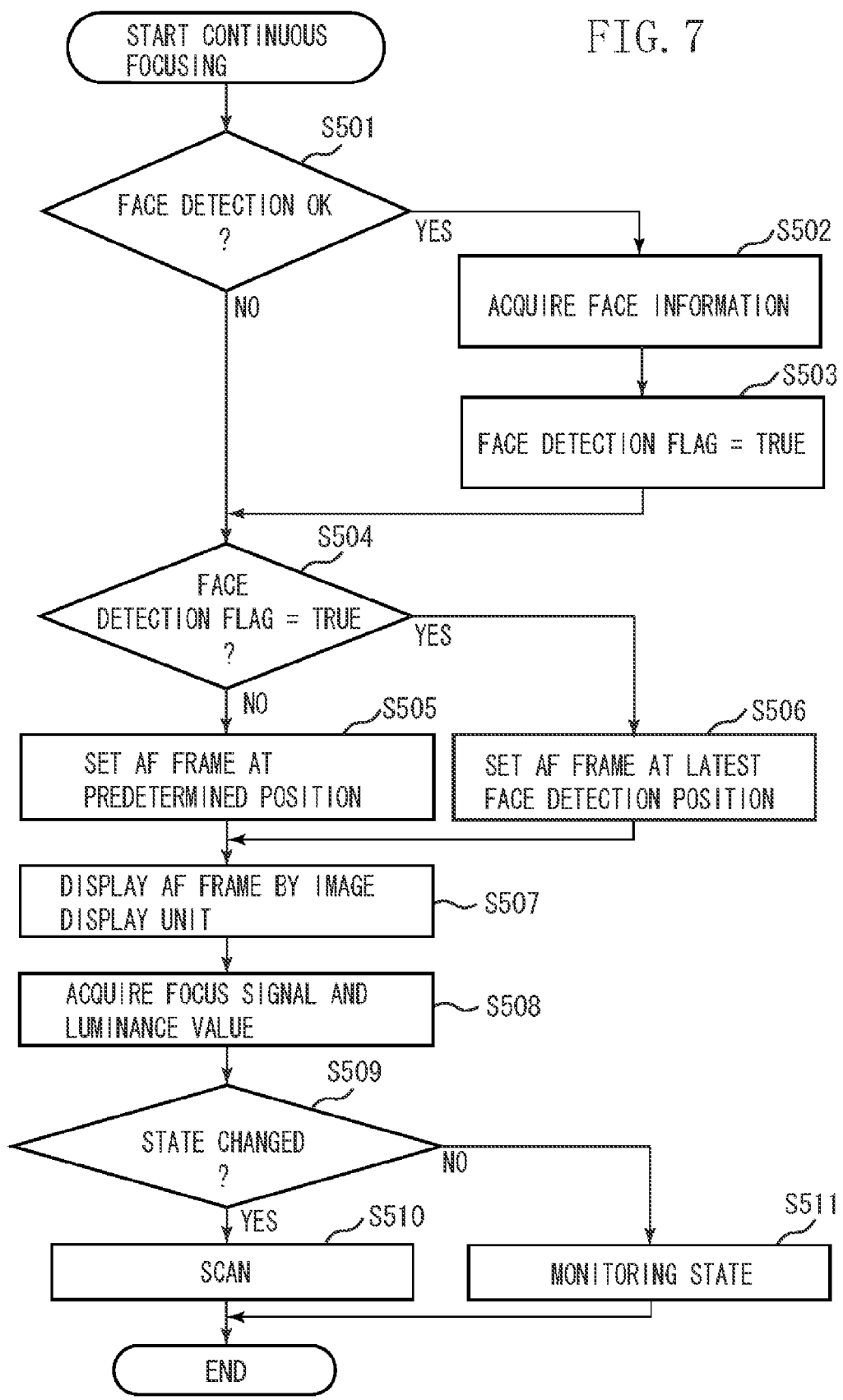
FIG. 7 is a flowchart illustrating a subroutine of a continuous focusing operation of the digital camera according to the exemplary embodiment of the present invention illustrated in FIG. 4.

Hereinafter, a subroutine for performing a continuous focusing operation in step S205 in the flowchart illustrated in FIG. 4 is described with reference to a flowchart illustrated in FIG. 7.

First, in step S501, the system control unit 50 determines whether a person's face is detected in the face detection processing in step S118. If the face is detected (YES in step S501), the processing proceeds to step S502. If the face is not detected (NO in step S501), the processing proceeds to step S504.

In step S502, the system control unit 50 acquires face information representing the position and the size of the face detected in the face detection processing in step S118. In step S503, the system control unit 50 sets a value of "TRUE" in the face detection flag indicating that the face is detected.

In step S504, the system control unit 50 checks a state of the face detection flag. If the value of the face detection flag is "TRUE" (YES in step S504), the processing proceeds to step S506. If the value of the face detection flag is "FLASE", the processing proceeds to step S505. In step S506, the system control unit 50 sets the AF frame 602 at the latest detection position. In step S505, the system control unit 50 sets the AF frame 602 at a predetermined position, e.g., in a central area (see FIGS. 6Da, 6Db, and 6Dc).

In step S507, the system control unit 50 causes the image display unit 28 to display the AF frame 602 set in step S505 or S506. For example, in a case where the AF frame 602 is used as a face frame, and where the object moves from a position illustrated in FIG. 6Aa to a position illustrated in FIG. 6Ac, the size of the AF frame 602 can be set at a predetermined size when the face is detected. Alternatively, the size of the AF frame 602 can be set based on the size of a characteristic portion of the object, e.g., the size of the detected face of a person when the object is the person. The color of each of the AF frames 602 illustrated in FIGS. 6Aa through 6Dc is set to differ from those of the frame displays indicated in steps S210 and S211, respectively.

In step S508, the system control unit 50 acquires a focus signal and a luminance value from the object in the AF frame 602 set in step S505 or S506. In step S509, the system control unit 50 compares the value represented by the acquired focus signal with that represented by the focus signal acquired at the last scan. Then, the system control unit 50 determines whether the difference therebetween is equal to or more than a threshold. If the difference therebetween is equal to or more than the threshold (YES in step S509), the system control unit 50 determines that the state of the apparatus is changed. Then, the processing proceeds to step S310.

In step S510, the system control unit 50 performs scan in an AF mode and moves the photographic lens 103 to a peak position of the focus signal or to a position to which the level of the focus signal rises. Then, the processing ends. In step S511, the system control unit 50 stops driving the photographic lens 103. Then, the system control unit 50 is put into a state (monitoring state) in which the system control unit 50 acquires a focus signal.

Figure 8:
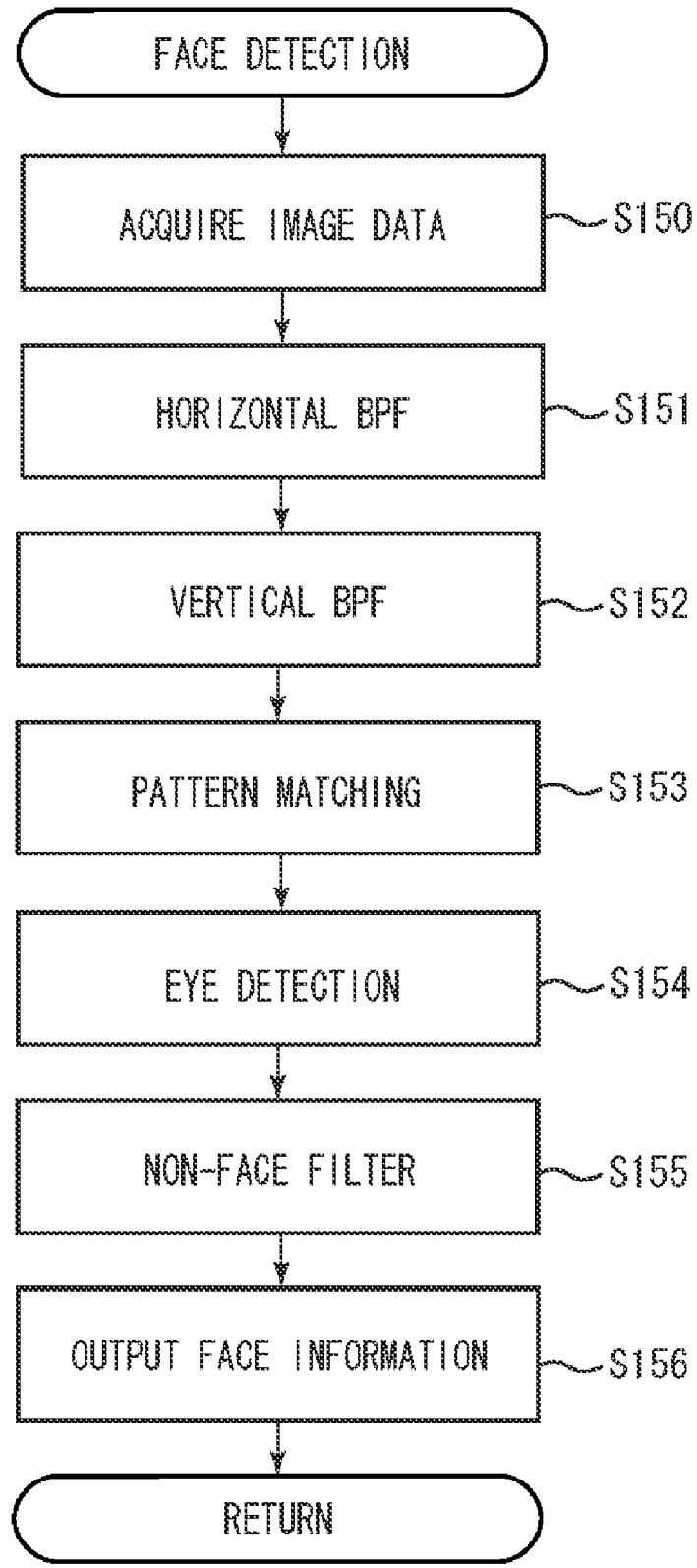
FIG. 8 is a flowchart illustrating a face detection sequence performed by a digital camera according to an exemplary embodiment of the present invention.

Next, a typical face detection algorithm for performing the face detection sequence described in the foregoing description of step S118 is described below with reference to FIG. 8.

In step S151, the system control unit 50 applies a horizontal band-pass filter to image data obtained in step S150. Then, in step S152, the system control unit 50 applies a vertical band-pass filter to the image data. Thus, the system control unit 50 detects an edge component. Subsequently, in step S153, the system control unit 50 performs pattern matching on the detected edge component. Consequently, the system control unit 50 extracts groups of candidates for eyes, a nose, a mouth, and ears.

In step S154, the system control unit 50 determines and selects, among the groups of candidates for eyes extracted in step S153, only a group of candidates for eyes, which satisfy preset conditions (e.g., the distance between two eyes and the inclination of each of the eyes) as valid image data representing a pair of eyes. Thus, the system control unit 50 narrows down the groups of candidates for eyes to the selected group of candidates for eyes as the valid candidates therefor.

In step S155, the system control unit 50 associates the selected group of candidates for eyes with other parts (i.e., the nose, the mouth, and the ears) of an associated face so as to obtain resultant data. In addition, the system control unit 50 applies a non-face condition filter to the resultant data. Thus, the detection of a face of a person is achieved. In step S156, the system control unit 50 outputs face information associated with a result of the detection. Then, the processing ends.

Thus, the system control unit 50 extracts amounts of characteristics of image data using image data displayed as captured by the imaging unit 22. In the foregoing description of the present embodiment, the face information has been described as an example of object information. However, there are various types of information, e.g., red-eye information, as the object information.

The system control unit 50 causes, when a continuous focusing operation is performed, the image display unit 28 to display the AF frame 601 or 602 indicating a range, in which an object displayed on the screen of the image display unit 28 is brought into focus, as a display indicating the continuous focusing operation by changing the state, e.g., the colors, the frame types, and the display conditions (e.g., a blinking condition and a frame design) of the AF frame 601 or 602. Consequently, an operator can distinguish whether the photographic lens 103 driven by the lens drive unit 115 is in a continuous focusing operation state or in an in-focus state by locking a focus.

FIG. 9 is a flowchart illustrating an AF/AE sequence to be performed by a digital camera according to a modification of the exemplary embodiment of the present invention. According to this modification, step S602 in which an operator preliminarily determines the activation/inactivation (on/off) of the setting of a continuous focusing operation is added to the above exemplary embodiment of the present invention. This modification is obtained by changing an operation of displaying an in-focus state while locking a focus, in a case where the setting of the continuous focusing operation is off, or where the continuous focusing operation is inappropriate.

First, in step S600, the system control unit 50 determines, based on the on/off of the first shutter switch SW1, whether the setting of the continuous focusing operation is on. The lens drive unit 115 continuously performs focusing by conducting the continuous focusing operation.

If the first shutter switch SW1 is on (YES in step S600), the processing proceeds to step S602, in which the system control unit 50 determines whether the setting of the continuous focusing operation is on. If the setting of the continuous focusing operation is on (YES in step S602), the system control unit 50 determines that the setting of the continuous focusing operation is on in a current state. Then, the processing proceeds to step S603. If the setting of the continuous focusing operation is off (NO in step S602), the system control unit 50 determines that the current state is not a continuous focusing operation state, and assumes that the current state is an ordinary AF state. Then, the processing proceeds to step S608.

If the setting of a continuous focusing operation is off (NO in step S602), that is, in the case of the normal AF state, the system control unit 50 causes the image display unit 28 to display an in-focus state. For example, in the case of an in-focus state while locking a focus, the system control unit 50 causes the image display unit 28 to display the AF frame (see the AF frame 601 in FIGS. 6Aa through 6Ac) using green as the color of the frame. In the case of an out-of-focus state, the system control unit 50 outputs to the image display unit 28 a signal to set the color of the AF frame to be yellow. Next, the processing proceeds to step S609. In step S609, the system control unit 50 determines whether the second shutter switch SW2 is on or off. If the second shutter switch SW2 is on (YES in step S609), the captured image data is stored in the memory. If the second shutter switch SW2 is off (NO in step S609), the system control unit 50 repeats processing in steps S608 and S609 until the second shutter switch SW2 is turned on.

If the setting of the continuous focusing operation is on (YES in step S602), the processing proceeds to step S603. In step S603, the system control unit 50 determines the appropriateness of the continuous focusing operation based on, e.g., whether the frame rate is appropriate for the continuous focusing operation, or whether an exposure determined according to the shutter speed and the aperture value is possible for the continuous focusing operation.

If the continuous focusing operation is appropriate (YES in step S603), then in step S604, the system control unit 50 controls the lens drive unit 115 to perform the continuous focusing operation. Next, the processing proceeds to step S605. In step S605, the system control unit 50 outputs to the image display unit 28 information representing a focusing state in the continuous focusing operation. Then, the system control unit 50 causes the image display unit 28 to display the focusing state represented by the output information.

For example, in the case of an in-focus state, the system control unit 50 sets the color of the AF frame (see the AF frame 602 in FIGS. 6Ba through 6Bc) to be different from the color of the AF frame displayed when locking a focus. In the case of an out-of-focus state, the system control unit 50 sets the color of the AF frame to be red. In this case, in order to simply notify a user of the fact that the apparatus is in a continuous focusing operation state, the system control unit 50 can cause the image display unit 28 to simultaneously display an icon or a string of characters, which indicates that the apparatus is in a continuous focusing operation state. Alternatively, the in-focus state and the out-of-focus state can be indicated by characters without changing the color of the frame.

Subsequently, the processing proceeds to step S606, in which the system control unit 50 determines whether the shutter switch SW2 is pressed. If the shutter switch SW2 is on, i.e., the shutter switch SW2 is pressed by an operator, the system control unit 50 causes the memory to store the captured image data. Then, the system control unit 50 finishes the current sequence. On the other hand, if the shutter switch SW2 is off, the processing proceeds to step S607. In step S607, if a current operation state of the digital camera 100, i.e., an operation of the power unit and the like is appropriate, so that the apparatus can normally operate, the system control unit 50 waits for the turn-on of the shutter switch SW2 by the operator.

If the continuous focusing operation is impossible (NO in step S603), the system control unit 50 causes the image display unit 28 to display a current focusing state. In this case, in step S610, the system control unit 50 causes the image display unit 28 to display the current focusing state, similarly to the case of the normal AF state. More specifically, in the case of an in-focus state while locking a focus, the system control unit 50 causes the image display unit 28 to display the AF frame by setting the color thereof to be green. In the case of an out-of-focus state, the system control unit 50 outputs to the image display unit 28 a signal to set the color of the AF frame to be yellow. Next, the processing proceeds to step S611. In step S611, the system control unit 50 determines whether the second shutter switch SW2 is on or off. If the second shutter switch SW2 is on (YES in step S611), the captured image data is stored in the memory. If the second shutter switch SW2 is off (NO in step S611), the system control unit 50 repeats processing in steps S610 and S611 until the second shutter switch SW2 is turned on.

Thus, the system control unit 50 causes the image display unit 28 to distinctly display whether the photographic lens 103 operated by the lens drive unit 115 is in a continuous focusing operation state, or whether the apparatus is in an in-focus state while locking a focus. Accordingly, an operator can easily recognize whether the photographic lens 103 is in a state based on the continuous focusing operation, or whether the photographic lens 103 is at the first in-focus position after a normal AF focusing instruction is issued.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-237221 filed Sep. 16, 2008, which is hereby incorporated by reference herein in its entirety.

What is claimed is:

1. An imaging apparatus comprising:
an imaging unit configured to obtain image data by photoelectric conversion of object light that is incident thereon through an imaging optical system;
a display control unit configured to control a display unit to display the image data;
a switch configured to receive a focusing instruction issued to the imaging optical system;
a focusing unit configured to adjust a focusing state of the imaging optical system based on the image data,
a determination unit configured to determine, based on an imaging condition, whether focusing based on the continuous focusing operation is appropriate,
wherein when the focusing unit performs a continuous focusing operation in response to the focusing instruction received by the switch, the display control unit causes the display unit to provide a display indicating that the focusing unit is in a continuous focusing operation state,
wherein when the focusing unit does not perform the continuous focusing operation, the display control unit causes the display unit to provide a display indicating a focusing state determined by a focusing operation performed in response to an instruction received by the switch, which differs from the display indicating that the focusing unit is in the continuous focusing operation state,
wherein the focusing unit performs focusing based on the continuous focusing operation when a result of determination by the determination unit is that focusing based on the continuous focusing operation is appropriate.

2. The imaging apparatus according to claim 1, wherein the switch is a switch having at least two stages,
wherein a focusing instruction is received by a first stage of the switch, and
wherein an imaging instruction is received by a second stage of the switch.

3. The imaging apparatus according to claim 1, wherein the determination unit determines, based on at least one of a frame rate, a shutter speed, an aperture value, and a gain, whether focusing based on the continuous focusing operation is appropriate.

4. The imaging apparatus according to claim 1, wherein the display control unit does not update the display even when the determination unit determines, due to a change in the imaging condition, that focusing based on the continuous focusing operation is inappropriate after the focusing unit starts, based on a result of determination by the determination unit, focusing based on the continuous focusing operation.

5. The imaging apparatus according to claim 1, wherein when a result of determination by the determination unit is that focusing based on the continuous focusing operation is inappropriate, the focusing unit locks a focusing operation and provides a display indicating an in-focus state or an out-of-focus state.

6. The imaging apparatus according to claim 5, wherein the display control unit causes the display unit to provide a display indicating that the focusing unit is in the continuous focusing operation state, when the determination unit determines, due to a change in the imaging condition, that focusing based on the continuous focusing operation is appropriate after the determination unit determines that focusing based on the continuous focusing operation is inappropriate.

7. The imaging apparatus according to claim 1, wherein the display is provided using one of an autofocus (AF) frame, an icon, and a character.

8. A method for controlling an imaging apparatus including an imaging unit configured to obtain image data by photoelectric conversion of object light that is incident thereon through an imaging optical system, the method comprising:
    controlling a display unit to display the image data;
    receiving a focusing instruction issued to the imaging optical system;
    adjusting a focusing state of the imaging optical system based on the image data;
    determining, based on an imaging condition, whether focusing based on the continuous focusing operation is appropriate;
    when a continuous focusing operation is performed in response to the received focusing instruction, causing the display unit to provide a display indicating that the imaging apparatus is in a continuous focusing operation state;
    when the continuous focusing operation is not performed, causing the display unit to provide a display indicating a focusing state determined by a focusing operation performed in response to the focusing instruction, which differs from the display indicating that the imaging apparatus is in the continuous focusing operation state; and
    when a result of the determining is that focusing based on the continuous focusing operation is appropriate, adjusting the focusing state based on the continuous focusing operation.

* * * * *